(12) United States Patent
Cen

(10) Patent No.: US 7,267,198 B2
(45) Date of Patent: Sep. 11, 2007

(54) PORTABLE ELECTRIC GREASE GUN

(76) Inventor: Jianli Cen, Shijia, Chengnan, Yuyao City, Zhejiang Province (CN) 315400

( * ) Notice: Subject to any disclaimer, the term of this patent is extended or adjusted under 35 U.S.C. 154(b) by 0 days.

(21) Appl. No.: 11/229,636

(22) Filed: Sep. 20, 2005

(65) Prior Publication Data

US 2006/0091161 A1 May 4, 2006

Related U.S. Application Data

(63) Continuation of application No. PCT/CN2005/000786, filed on Jun. 6, 2005.

(30) Foreign Application Priority Data

Nov. 3, 2004 (CN) .................... 2004 2 0107665

(51) Int. Cl.
*F01M 11/04* (2006.01)
*G01F 11/36* (2006.01)
(52) U.S. Cl. .................... 184/105.2; 222/256
(58) Field of Classification Search ............ 184/105.1, 184/105.2; 222/256, 333
See application file for complete search history.

(56) References Cited

U.S. PATENT DOCUMENTS

| 1,964,005 | A | * | 6/1934 | Morton ........................ 91/49 |
| 2,626,085 | A | * | 1/1953 | MacKinnon ................ 222/262 |
| 2,928,574 | A | * | 3/1960 | Wagner ...................... 222/108 |
| 3,807,606 | A | * | 4/1974 | Foerst et al. ................ 222/262 |
| 3,808,904 | A | * | 5/1974 | Gotsch et al. ................. 74/343 |
| 4,970,355 | A | * | 11/1990 | Haeusslein et al. ....... 200/50.31 |
| 5,105,912 | A |   | 4/1992 | Heister ........................ 184/105 |
| 5,301,494 | A | * | 4/1994 | Peot et al. .................... 56/10.5 |
| 5,732,794 | A | * | 3/1998 | Orlitzky ........................ 184/61 |
| 6,125,969 | A | * | 10/2000 | Graf et al. ............... 184/105.1 |
| 6,135,327 | A | * | 10/2000 | Post et al. ................... 222/333 |
| 7,004,357 | B2 | * | 2/2006 | Shew .......................... 222/256 |
| 2003/0117107 | A1 | * | 6/2003 | Zick et al. ................... 320/112 |
| 2004/0231927 | A1 | * | 11/2004 | Huang et al. ............ 184/105.2 |
| 2005/0258005 | A1 | * | 11/2005 | Chen ........................ 184/105.2 |

FOREIGN PATENT DOCUMENTS

| CN | 1049901 A | 3/1991 |
| CN | 2101166 U | 4/1992 |
| CN | 2382940 Y | 6/2000 |
| DE | 29806515 | 7/1998 |
| JP | 8-145284 | 6/1996 |
| JP | 9-32993 | 2/1997 |

* cited by examiner

*Primary Examiner*—Chong H. Kim
(74) *Attorney, Agent, or Firm*—Jacobson Holman PLLC

(57) ABSTRACT

This invention discloses a portable electrical grease gun which relates to electric tool field. The portable electrical grease gun according to the present invention, in which conventional slide block assembly driving structure is replaced by a crank link mechanism. As a result, the structure of the product is compact and simple. The crank link mechanism is constructed at low cost. The friction is low during operation. The operation is stable and reliable. It is easy for bulk production. In addition, the volume of the portable electrical grease gun according to the present invention is small so that it is easy to take and operate conveniently.

9 Claims, 4 Drawing Sheets

PORTABLE ELECTRIC GREASE GUN

This is a continuation of PCT/CN05/00786 filed Jun. 6, 2005 and published in Chinese.

FIELD OF THE INVENTION

The present invention relates to an electric tool, specifically to a portable electric grease gun.

DESCRIPTION OF THE RELATED ART

Currently, manual grease guns have been widely used in various fields such as automobile and equipment maintenance etc. However, the manual grease gun suffers from many disadvantages, such as low grease delivery and intensive manual effort. Especially, the labor effort of the operator is much higher in the case of high pressure. Presently, there is a kind of electric grease gun in the foreign market, which is has a complicated construction and high manufacturing cost. It also produces high friction and consumes excessive energy due to the large contacting area between a slide block and a pump body. Additionally, the slide block of this electrical grease gun has a special structure which is difficult to manufacture, and may tend to seize up during operation. Thus, it prevents the electric grease gun from operating normally.

SUMMARY OF THE INVENTION

The object of the present invention is to provide a novel portable electrical grease gun, and to solve the problems such as complicated structure, high friction and tendency to seize up. The solution used to address these problems is to provide a portable electrical grease gun, consisting of a grease barrel, a handle, a crank link mechanism, a piston, a microswitch, a gearbox, a gear reduction mechanism and a D.C. motor, characterized in that:
A) the gear reduction mechanism is disposed in the gearbox, two ends of the gear reduction mechanism being connected to an output shaft of the D.C. motor and a crank of said crank link mechanism, respectively;
B) the piston is provided above the gearbox and reciprocate in a passage of the gearbox, one end of the piston being connected to the crank link mechanism;
C) the gearbox is provided with an air release valve, a grease filling valve, a grease discharge valve, a grease-jamming bolt and also provided with a grease outlet pipe and a pressure relief valve through a connecting member, spaced apart on said gearbox and fluidly communicating with each other and the passage where the piston reciprocates;
D) the handle is connected to the gearbox;
E) said handle is provided with a battery pack and an on-off button which is operatively connected to the microswitch; and F) said grease barrel is connected to the gearbox and provides a supply of grease into the gearbox.

In the portable electrical grease gun according to the present invention, the conventional slide block assembly driving structure is replaced by a crank link mechanism. Accordingly, the structure of the grease gun is compact and simple. The crank link mechanism is constructed at low cost. The friction is low during operation. The operation is stable and reliable. It is easy for bulk production. In addition, the size of the portable electrical grease gun according to the present invention is small so that it is easy to transport and can be operated conveniently.

As a further improvement of the present invention, the crank link mechanism comprises a crank, a driving link, a transmission link and a driven link connected sequentially in series, in which the transmission link is connected to the piston.

The crank link mechanism comprises:
the crank,
a driving link with its first end pivotally connected to the crank,
a transmission link with its first end pivotally connected to a second end of the driving link,
a driven link with its first end pivotally connected to a second end of the transmission link and a second end of the driven link being connected to the gearbox; and
said piston is pivotally connected to said transmission link at a point between pivotal connections of the first end and the second end of the transmission link with the driving link and driven link.

The gear reduction mechanism comprises an inner gear mounted in the gearbox, a planetary gear assembly provided in the inner gear and a sun gear located on an output shaft of the D.C. motor and inserted into the center of the planetary gear assembly, which elements are sequentially engaged in series. A gear baffle plate presses against the end surface of the inner gear. A mounting plate for the motor is connected to the end face of the gearbox.

The handle consists of a left half-handle and a right half-handle so that it is easy to assemble. A sleeve is provided on the top of the handle for mounting therein a free end of the grease outlet pipe. The sleeve consists of a left half-sleeve and a right half-sleeve, in which said left half-sleeve and said half-right sleeve are located on the left half-handle and the right half-handle, respectively. A hooking hole is provided at one end of the gearbox, whereby the grease gun can be hung up when it is not used.

As a further improvement of the present invention, the battery pack is connected to the handle. The on-off button is provided on the guiding plate in the handle. A compressed spring is located in the on-off button and pushes the microswitch through a limit baffle plate. An anti-interference and a resettable fuse are disposed in the handle.

BRIEF DESCRIPTION OF THE DRAWINGS

The present invention will now be further described with reference to the accompanying drawings.

Figure 1:
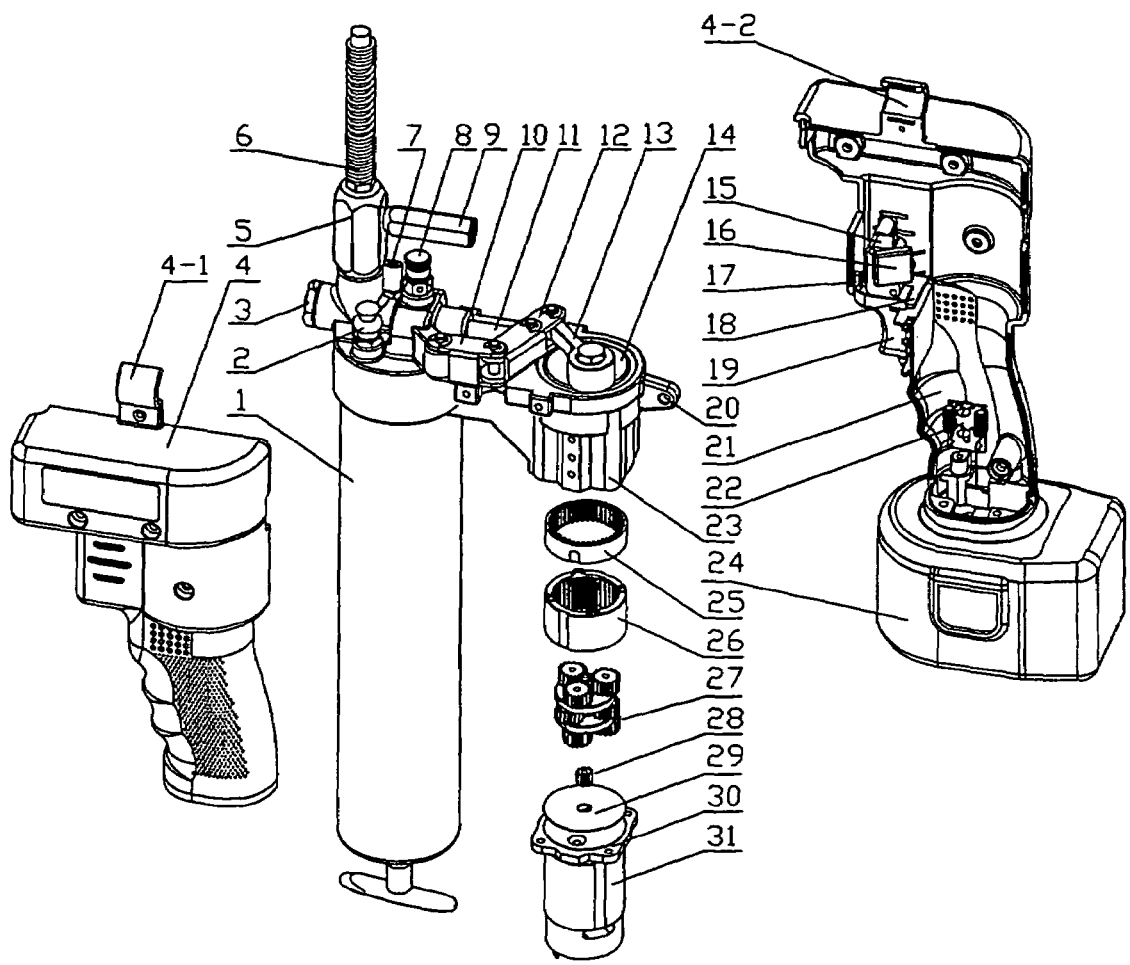
FIG. 1 is an exploded view showing the structure according to the present invention.
Figure 2:
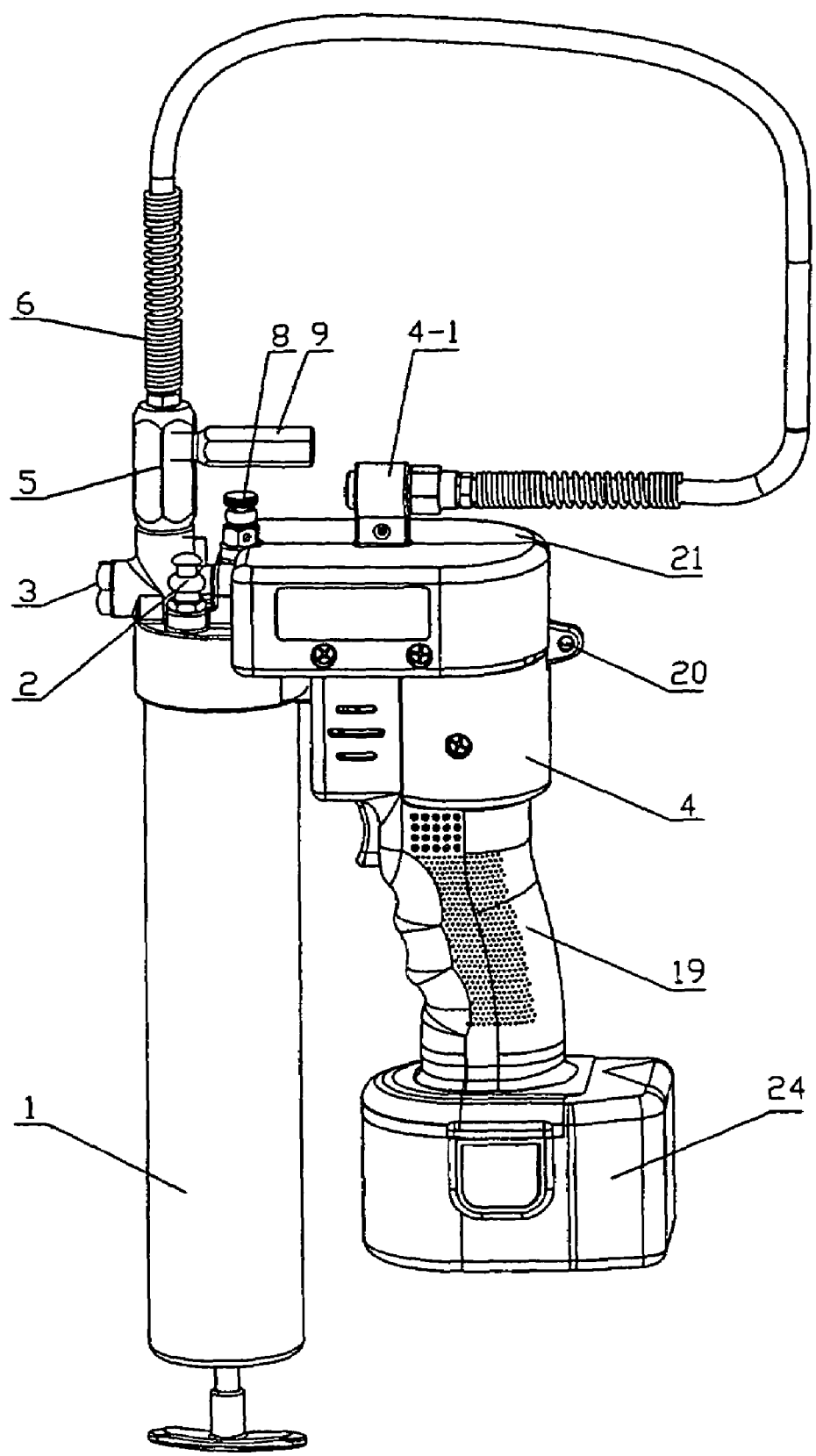
FIG. 2 is a view showing the assembled electrical grease gun of FIG. 1.
Figure 3:
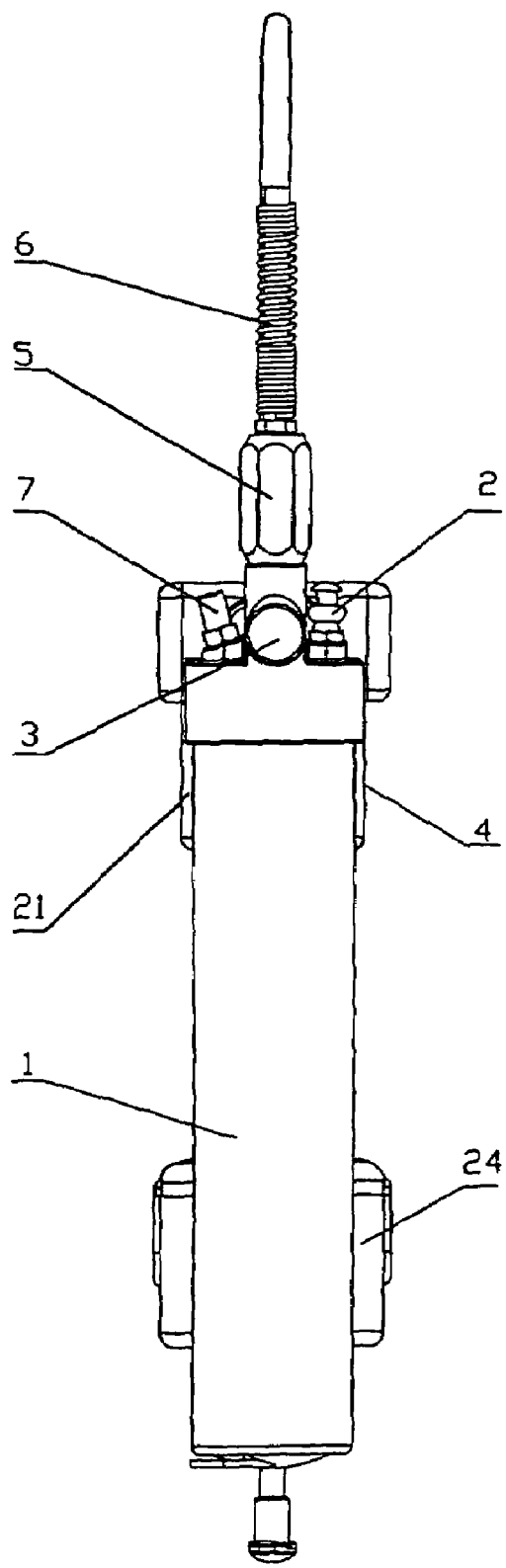
FIG. 3 is a left side elevational view of the electrical grease gun of FIG. 2.
Figure 4:
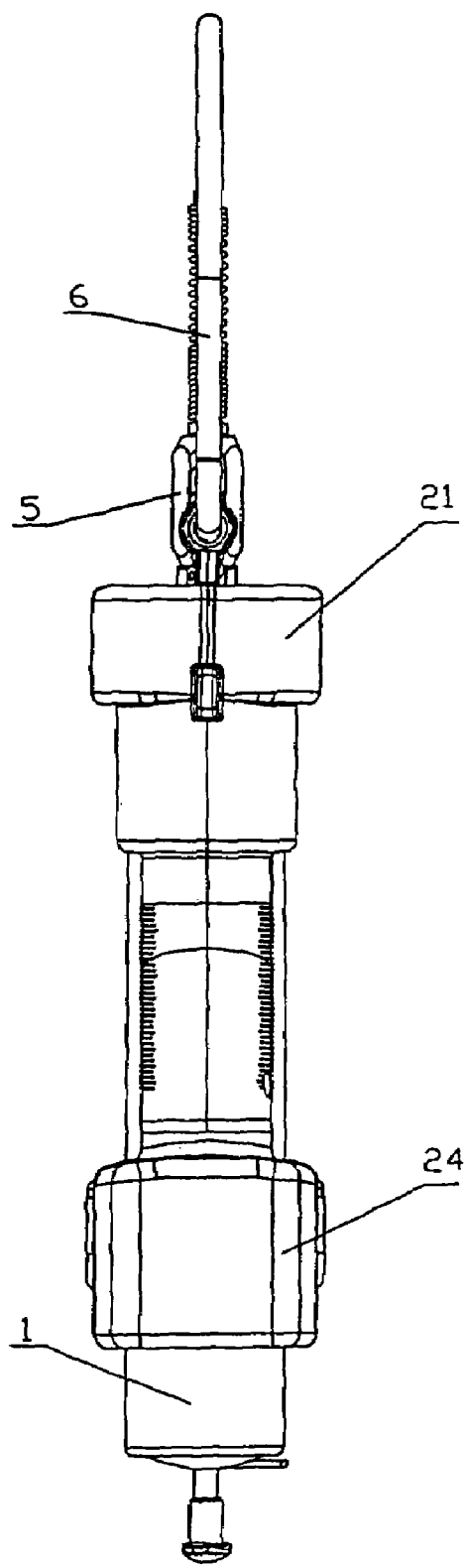
FIG. 4 is a right side elevational view of the electrical grease gun of FIG. 2.
Figure 5:
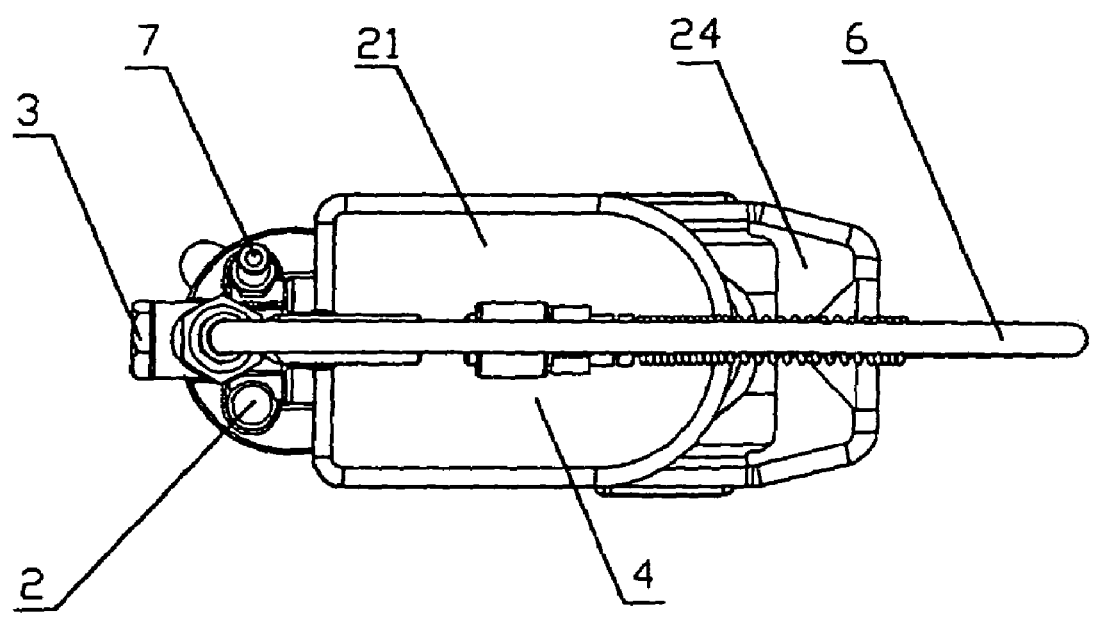
FIG. 5 is a top plan view of the electrical grease gun of FIG. 2.

The reference numbers and names of parts in above figures are: 1. grease barrel; 2. air release valve; 3. grease-jamming bolt; 4. left half-handle; 5. connecting member; 6. grease outlet pipe; 7. grease filling valve; 8. grease discharge valve; 9. pressure relief valve; 10. driven link; 11. piston; 12. transmission link; 13. driving link; 14. crank; 15. microswitch; 16. resettable fuse; 17. limit baffle plate; 18. guiding plate; 19. on-off button; 20. hooking hole; 21. right half-handle; 22.anti-interference circuit board; 23. gearbox; 24. battery pack; 25. first inner gear; 26. second inner gear;

27. planetary gear assembly; 28. sun gear 29. gear baffle plate; 30. mounting plate for motor; 31. D.C. motor.

DETAILED DESCRIPTION OF THE INVENTION

With reference to the figures, the portable electrical grease gun according to the present invention, comprises: a grease barrel 1, a left half-handle 4, a right half-handle 21, a crank link mechanism, a piston 11, a microswitch 15, an on-off button 19, a gearbox 23, a battery pack 24, a gear reduction mechanism, a gear baffle plate 29, a mounting plate for motor 30 and a D.C. motor 31, wherein the battery pack 24 is connected to the handle 4, 21 by means of a male-female interconnection (plug); the on-off button 19 is provided on a guiding plate 18 in the right half-handle 21 and can move along the guiding plate 18 by an internal spring; and the microswitch 15 is pushed by a limit baffle plate 17 located above the on-off button 19. One end of the gearbox 23 is provided with a hooking hole 20.

The gear reduction mechanism is disposed in the gearbox 23, it comprises: first and second inner gears 25,26, a planetary gear assembly 27 and a sun gear 28 engaged sequentially in series, wherein the inner gears 25,26 are mounted in the gearbox 23. The planetary gear assembly 27 is disposed in the inner gears 25,26 and the sun gear 28 is mounted on an output shaft of the D.C. motor 31 and inserted into the center of the planetary gear assembly 27. The gear baffle plate 29 is pressed against the end surface of the second inner gear 26, and the mounting plate 30 for the motor is connected to the bottom end surface of the gearbox 23.

The crank link mechanism comprises a crank 14, a driving link 13, a transmission link 12 and a driven link 10 sequentially connected in series by retaining rings and bolts, wherein the distal end of the driven link 10 is connected to the top of the gearbox 23 and the transmission link 12 is connected with the piston 11 which is provided above the gearbox 23. The gear box 23 is provided with an air release valve 2, a grease filling valve 7, a grease discharge valve 8 and is also provided with a grease outlet pipe 6, a pressure relief valve 9 and a grease-jamming bolt 3, each being connected to a connecting member 5. The connecting member 5 is connected to the top of the gearbox 23.

After the left half-handle 4 and the right half-handle 21 are coupled together, they are mounted on the gearbox 23 by bolts. The tip of the left half-handle 4 is provided with a left half-sleeve 4-1. The tip of the right half-handle 21 is provided with a right half-sleeve 4-2. The left half-sleeve 4-1 and the right half-sleeve 4-2 are coupled so as to form a cylindrical sleeve for mounting the free end of the outlet pipe 6 therein.

When it is necessary to assemble the portable electrical grease gun according to the present invention, the battery pack 24 is plugged into the slot on the lower portion of the handles 4,21. A lead wire is connected to the D.C. motor 31 through the microswitch 15, a resettable fuse 16 and an anti-interference circuit board 22, etc. The grease barrel 1 is screwed to the bottom of the gearbox 23 after it is filled with grease. The greaseoutlet pipe of a grease charger may also be connected to the grease filling valve 7 to directly charge the grease barrel 1 with grease. The air in grease barrel 1 and gearbox 23 is discharged by pressing the air release valve 2. If the air in the upper portion of the gearbox 23 cannot be adequately discharged, an adjusting bolt on the tip of the air grease discharge valve 8 can be adjusted so that the grease is discharged together with the air. The microswitch 15 is driven by the limit baffle plate 17 provided above the on-off button 19 when the on-off button 19 is pressed. When the microswitch 15 is turned on, the D.C. motor 31 starts rotating. The speed of rotation is reduced through the sun gear 28, the planetary gear reduction assembly 27 and the inner gears 25, 26. Then, the crank 14 is rotated. The driving link 13 is driven by the crank 14. The transmission link 12 is driven by the driving link 13. The piston 11 is driven by the transmission link 12 to provide reciprocating linear motion. The transmission link 12 is swung by the actuation of the driving link 13. The driven link 10 is swung by the actuation of the transmission link 12. The grease in the grease barrel 1 is continuously pushed into the grease outlet pipe 6 when the piston 11 continuously provides the reciprocating linear motion.

It is to be understood that embodiments as mentioned above are only illustrations of the present invention, but not the limitations of and, any possible other embodiments and modifications without departing from the principle of the present invention may fall into the protected scope of the present invention.

The invention claimed is:

1. A portable electrical grease gun comprising a grease barrel, a handle, a crank link mechanism, a piston, a microswitch, a gearbox, a gear reduction mechanism and a D.C. motor, wherein:
    a) said gear reduction mechanism is disposed in said gearbox, two ends of the gear reduction mechanism being operably connected to an output shaft of said D.C. motor and a crank of said crank link mechanism, respectively;
    b) said piston is provided above said gearbox and reciprocates in a passage of the gearbox, one end of the piston being connected to said crank link mechanism;
    c) said gearbox is provided with an air release valve, a grease filling valve, a grease discharge valve, and a grease outlet pipe spaced apart on said gearbox and fluidly communicating with each other and the passage where the piston reciprocates via the gearbox;
    d) said handle is connected to the gearbox and is provided with a battery pack and an on-off button which is operably connected to said microswitch; and
    e) said grease barrel is connected to the gearbox and provides a supply of grease into the gearbox; and
    wherein said crank link mechanism comprises:
        the crank,
        a driving link with its first end pivotally connected to the crank,
        a transmission link with its first end pivotally connected to a second end of the driving link, and
        a driven link with its first end pivotally connected to a second end of the
        transmission link and a second end of the driven link being connected to the gearbox; and
        wherein said end of the piston is pivotally connected to said transmission link at a point between pivotal connections of the first end and the second end of the transmission link with the driving link and the driven link.

2. The portable electrical grease gun according to claim 1, wherein said gear reduction mechanism comprises inner gears, a planetary gear assembly and a sun gear sequentially and operably engaging with each other, wherein the inner gears are mounted in said gearbox, the planetary gear assembly is provided in said inner gears, the sun gear is located on an output shaft of said D.C. motor and mounted in the center of said planetary gear assembly, a gear baffle plate presses against an end surface of one of said inner gears, and a mounting plate for the motor is connected to an end surface of said gearbox.

3. The portable electrical grease gun according to claim 1, wherein said handle consists of a left half-handle and a half-right handle.

4. The portable electrical grease gun according to claim 1, wherein a sleeve is provided above said handle for mounting a free end of said grease outlet pipe therein.

5. The portable electrical grease gun according to claim 4, wherein said sleeve consists of a left half-sleeve and a right half-sleeve.

6. The portable electrical grease gun according to claim 1, wherein a hooking hole is provided at one end of said gearbox.

7. The portable electrical grease gun according to claim 1, wherein said battery pack is operably connected to said handle.

8. The portable electrical grease gun according to claim 1, wherein said on-off button is provided on a guiding plate in said handle, a compressed spring is located in said on-off button and pushes said microswitch through a limit baffle plate.

9. The portable electrical grease gun according to claim 1, wherein an anti-interference circuit board and a resettable fuse is disposed in said handle.

* * * * *